US008464741B2

(12) United States Patent
Sawusch

(10) Patent No.: US 8,464,741 B2
(45) Date of Patent: Jun. 18, 2013

(54) FLOW CONTROL METHOD FOR MULTIZONE GAS DISTRIBUTION

(75) Inventor: Stefan Sawusch, Pirna (DE)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 13/194,454

(22) Filed: Jul. 29, 2011

(65) Prior Publication Data

US 2011/0277847 A1 Nov. 17, 2011

Related U.S. Application Data

(62) Division of application No. 12/013,907, filed on Jan. 14, 2008, now abandoned.

(51) Int. Cl.
*G05D 11/13* (2006.01)

(52) U.S. Cl.
USPC .......... 137/12; 137/89; 137/101.19; 137/110; 137/486; 137/487.5; 137/861; 700/285

(58) Field of Classification Search
USPC ............. 137/12, 861, 486, 487.5, 89, 101.19, 137/110, 87.04; 700/282, 283, 285
See application file for complete search history.

(56) References Cited

U.S. PATENT DOCUMENTS

| | | | | |
|---|---|---|---|---|
| 3,762,428 | A * | 10/1973 | Beck et al. | 137/88 |
| 4,345,612 | A * | 8/1982 | Koni et al. | 137/101.19 |
| 6,227,227 | B1 * | 5/2001 | Poleshuk et al. | 137/98 |
| 6,333,272 | B1 | 12/2001 | McMillin et al. | |
| 6,543,469 | B2 * | 4/2003 | Lewit et al. | 137/101.19 |
| 6,581,623 | B1 | 6/2003 | Carpenter et al. | |
| 6,752,166 | B2 | 6/2004 | Lull et al. | |
| 2004/0187928 | A1 | 9/2004 | Ambrosina et al. | |
| 2005/0029369 | A1 | 2/2005 | Nagaoka et al. | |

* cited by examiner

*Primary Examiner* — William McCalister
(74) *Attorney, Agent, or Firm* — Wood, Herron & Evans, LLP

(57) ABSTRACT

A method of supplying and controlling the flow of a process gas to a process chamber. The method includes initiating a known flow rate of a process gas to a process chamber, dividing the known flow rate of the process gas into a first flow of the process gas at a first flow rate and a second flow of the process gas at a second flow rate, measuring a first pressure associated with the first flow of the process gas, measuring a second pressure associated with the second flow of the process gas, and controlling the first flow rate and the second flow rate according to a target flow condition by adjusting a first conductance of the first flow of the process gas and a second conductance of the second flow of the process gas and monitoring the first pressure and the second pressure.

7 Claims, 6 Drawing Sheets

FLOW CONTROL METHOD FOR MULTIZONE GAS DISTRIBUTION

CROSS-REFERENCE TO RELATED APPLICATIONS

The present application is a divisional of co-pending U.S. application Ser. No. 12/013,907 entitled FLOW CONTROL SYSTEM AND METHOD FOR MULTIZONE GAS DISTRIBUTION, filed on Jan. 14, 2008, the disclosure of which is hereby incorporated herein by reference in its entirety.

BACKGROUND OF THE INVENTION

1. Field of the Invention

The invention relates to a flow control system for controlling the flow of process gas to a process chamber and a method of operating and, in particular, a flow control system for and method of controlling a multizone gas distribution system.

2. Description of Related Art

The fabrication of integrated circuits (IC) in the semiconductor industry typically employs plasma to create and assist surface chemistry within a processing chamber necessary to remove material from and deposit material on a substrate. In general, plasma is formed within the processing chamber under vacuum conditions by heating electrons in the presence of an electric field to energies sufficient to sustain ionizing collisions with a supplied process gas. Moreover, the heated electrons can have energy sufficient to sustain dissociative collisions and, therefore, a specific set of gases under predetermined conditions (e.g., chamber pressure, gas flow rate, etc.) are chosen to produce a population of charged species and chemically reactive species suitable to the particular process being performed within the chamber (e.g., etching processes where materials are removed from the substrate or deposition processes where materials are added to the substrate).

In plasma processing systems, the uniformity of process results across the substrate are affected by spatial variations in plasma density within the process space above the substrate, typically expressed as a spatial distribution of electron density $n_e(r,\theta)$, spatial variations in process chemistry (i.e., spatial distribution of chemical species), and spatial variations of the substrate temperature. Often times, the residence time $\tau(r,\theta)$ of chemical species in the process space may be correlated with the amount of plasma dissociation occurring due to interactions between chemical constituents and energetic electrons and, hence, the residence time may be correlated with process chemistry; i.e., the greater the residence time, the greater the amount of dissociation of chemical constituents and the lesser the residence time, the lesser the dissociation of chemical constituents.

Common to many of these systems, the process gas is introduced to the process chamber through a showerhead gas distribution system having a plurality of gas passages formed there through. Therefore, in an effort to affect spatial variations in the process space above a substrate, multizone gas distribution systems have been contemplated. However, there remains a need to control the flow properties of the multizone gas distribution system.

Furthermore, the processes described above are sensitive to the conditions achieved within the plasma processing system and, in order to meet expected yields, precise control of these conditions is now required. For example, changes in these conditions due to either abrupt changes (or faults), or gradual changes require constant monitoring. Therefore, it is of increasing importance to detect fault conditions, determine whether the fault is real or erroneous, and determine if a service condition is present.

SUMMARY OF THE INVENTION

The invention relates to a flow control method for controlling the flow of process gas to a process chamber and, in particular, a flow control method of controlling a multizone gas distribution system.

According to one embodiment, a method of supplying a process gas to a process chamber is described, comprising: initiating a known flow rate of a process gas to a process chamber; dividing the known flow rate of the process gas into a first flow of the process gas at a first flow rate and a second flow of the process gas at a second flow rate; measuring a first pressure associated with the first flow of the process gas; measuring a second pressure associated with the second flow of the process gas; and controlling the first flow rate and the second flow rate according to a target flow condition by adjusting a first conductance of the first flow of the process gas and a second conductance of the second flow of the process gas and monitoring the first pressure and the second pressure.

DETAILED DESCRIPTION OF EXEMPLARY EMBODIMENTS

In the following description, for purposes of explanation and not limitation, specific details are set forth, such as a particular geometry of the plasma processing system and descriptions of various components. However, it should be understood that the invention may be practiced in other embodiments that depart from these specific details.

Nonetheless, it should be appreciated that, contained within the description are features which, notwithstanding the inventive nature of the general concepts being explained, are also of an inventive nature.

According to an embodiment, a multizone gas distribution system configured to be coupled to a process chamber is described. The multizone gas distribution system comprises a first gas distribution element and a second gas distribution element. Additionally, the multizone gas distribution system comprises a flow control system configured to divide a flow of process gas between the first gas distribution element and the second gas distribution element. Further, a system controller coupled to the flow control system is configured to adjust the flow of process gas to the first gas distribution element and the second gas distribution element according to a target flow condition. Further yet, the system controller is configured to monitor the flow control system in order to perform at least one of monitoring a flow rate, adjusting a flow rate, controlling a flow rate, determining a fault condition, and determining an erroneous fault condition.

Figure 1:
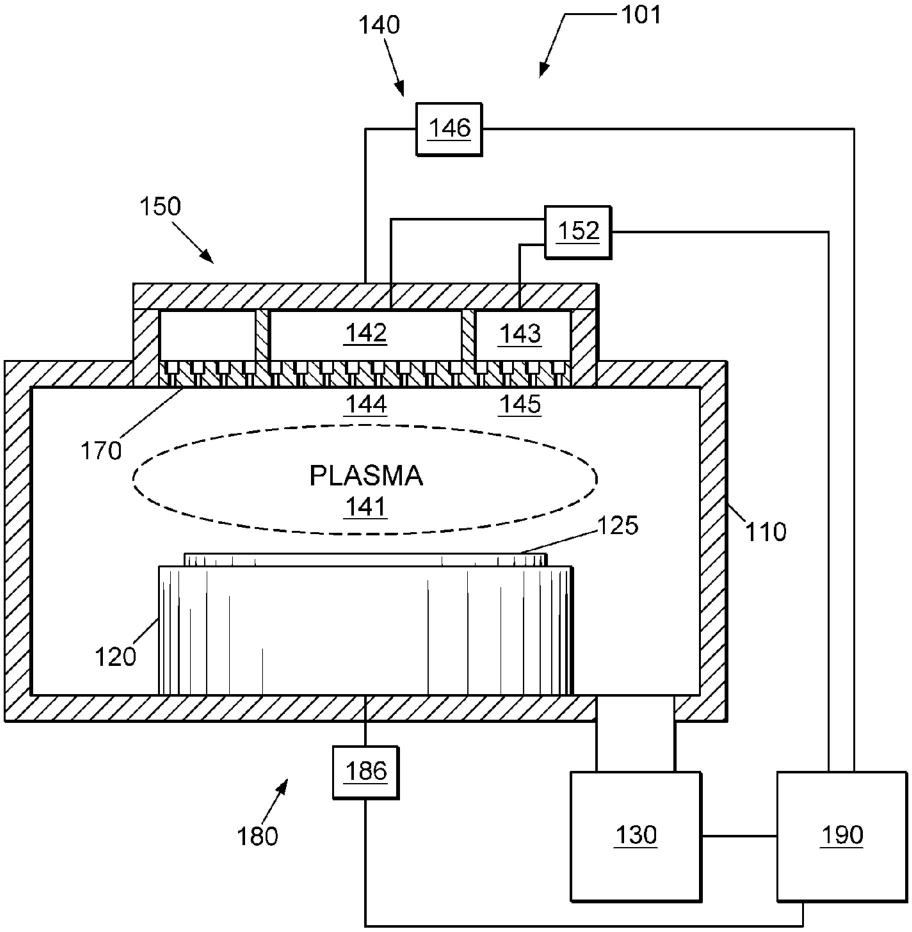
FIG. 1 shows a plasma processing system according to an embodiment.

According to another embodiment, a plasma processing system 101 is depicted in FIG. 1 comprising a process chamber 110, a substrate holder 120, upon which a substrate 125 to be processed is affixed, a vacuum pumping system 130, and a system controller 190. Substrate 125 can be a semiconductor substrate, a wafer, a flat panel display, or a liquid crystal display.

A multizone gas distribution system comprising a multizone gas distribution assembly 150 is coupled to the process chamber 110 and is configured to introduce an ionizable gas or mixture of process gases. The multizone gas distribution assembly 150 comprises a first gas plenum 142 that may be configured to introduce process gas to process space 141 at a substantially central location 144 above substrate 125. Additionally, the multizone gas distribution assembly 150 comprises a second gas plenum 143 that may be configured to introduce process gas to process space 141 at a substantially peripheral location 145 above substrate 125. The first gas plenum 142 and the second gas plenum 143 may be pneumatically isolated from one another, or they may be partially or fully open to one another.

Each of the first gas plenum 142 and the second gas plenum 143 is configured to receive an independent flow of process gas through an inlet and distribute each flow of process gas in a process space 141. Each of the first gas plenum 142 and the second gas plenum 143 of the multizone gas distribution assembly 150 may comprise a showerhead gas distribution plate 170 having a supply side that interfaces with the respective gas plenum 142 or 143, a process side that interfaces with the process space 141, and a plurality of gas passages formed from the supply side to the process side. The showerhead gas distribution plate 170 may include a monolithic structure coupled to both the first gas plenum 142 and the second gas plenum 143, or it may include separate plates independently coupled to each gas plenum.

Referring still to FIG. 1, a flow control system 152 is coupled to the multizone gas distribution assembly 150, and configured to introduce one or more process gases to the first gas plenum 142 and the second gas plenum 143. The flow control system 152 is configured to perform at least one of monitoring the flow to the first plenum 142 and the second plenum 143, adjusting the flow to the first plenum 142 and the second plenum 143, controlling the flow to the first plenum 142 and the second plenum 143, determining a fault condition for the flow of process gas to the first plenum 142 or the second plenum 143 or both, determining an erroneous fault condition for the flow of process gas to the first plenum 142 or the second plenum 143 or both, or determining a service condition for the flow of process gas to the first plenum 142 or the second plenum 143 or both.

A plasma generation system 140 is coupled to the process chamber 110 and is configured to facilitate the generation of plasma in process space 141 in the vicinity of a surface of substrate 125. Plasma can be utilized to create materials specific to a pre-determined materials process, and/or to aid the removal of material from the exposed surfaces of substrate 125. The plasma processing system 101 can be configured to process substrates of any desired size, such as 200 mm substrates, 300 mm substrates, or larger. The plasma generation system 140 comprises at least one of a capacitively coupled plasma source, an inductively coupled plasma source, a transformer coupled plasma source, a microwave plasma source, a surface wave plasma source, or a helicon wave plasma source.

For example, the plasma generation system 140 may comprise an upper electrode to which radio frequency (RF) power is coupled via a RF generator 146 through an optional impedance match network. Electromagnetic (EM) energy at a radio frequency is capacitively coupled from the upper electrode to plasma in process space 141. A typical frequency for the application of RF power to the upper electrode can range from about 10 MHz to about 100 MHz. Further, for example, the upper electrode may be integrated with the multizone gas distribution system 150.

An impedance match network may serve to improve the transfer of RF power to plasma by reducing the reflected power. Match network topologies (e.g. L-type, π-type, T-type, etc.) and automatic control methods are well known to those skilled in the art.

A substrate bias system 180 may be coupled to the process chamber 110 and may be configured to electrically bias substrate 125. For example, substrate holder 120 can comprise an electrode through which RF power is coupled to substrate 125 in order to adjust and/or control the level of energy for ions incident upon the upper surface of substrate 125. For example, substrate holder 120 can be electrically biased at a RF voltage via the transmission of RF power from a RF generator 186 through an optional impedance match network to substrate holder 120. The substrate bias system 180 may serve to heat electrons to form and maintain plasma. Additionally, the substrate bias system 180 may serve to adjust and/or control the ion energy at the substrate. A typical frequency for the RF bias can range from about 0.1 MHz to about 100 MHz. RF systems for plasma processing are well known to those skilled in the art.

Vacuum pumping system 130 may include a turbo-molecular vacuum pump (TMP) capable of a pumping speed up to about 5000 liters per second (and greater) and a gate valve for throttling the chamber pressure. In conventional plasma processing devices utilized for dry plasma etch, a 1000 to 3000 liter per second TMP can be employed. TMPs are useful for low pressure processing, typically less than about 50 mTorr. For high pressure processing (i.e., greater than about 100 mTorr), a mechanical booster pump and dry roughing pump can be used. Furthermore, a device for monitoring chamber pressure (not shown) can be coupled to the process chamber 110. The pressure measuring device can be, for example, a Type 628B Baratron absolute capacitance manometer commercially available from MKS Instruments, Inc. (Andover, Mass.).

System controller 190 may comprise a microprocessor, memory, and a digital I/O port capable of generating control voltages sufficient to communicate and activate inputs to plasma processing system 101 as well as monitor outputs from plasma processing system 101. Moreover, system controller 190 can be coupled to and can exchange information with multizone gas distribution system 150, flow control system 152, plasma generation system 140, substrate holder 120, substrate bias system 180, and vacuum pumping system 130. For example, a program stored in the memory can be utilized to activate the inputs to the aforementioned components of plasma processing system 101 according to a process recipe in order to perform a plasma assisted process on substrate 125.

System controller 190 may be locally located relative to the plasma processing system 101, or it may be remotely located relative to the plasma processing system 101. For example, system controller 190 can exchange data with plasma processing system 101 using a direct connection, an intranet, and/or the internet. System controller 190 can be coupled to an intranet at, for example, a customer site (i.e., a device maker, etc.), or it can be coupled to an intranet at, for example, a vendor site (i.e., an equipment manufacturer). Alternatively or additionally, system controller 190 can be coupled to the internet. Furthermore, another computer (i.e., controller, server, etc.) can access system controller 190 to exchange data via a direct connection, an intranet, and/or the internet.

Furthermore, embodiments of this invention may be used as or to support a software program executed upon some form of processing core (such as a processor of a computer, e.g., system controller 190) or otherwise implemented or realized upon or within a machine-readable medium. A machine-readable medium includes any mechanism for storing information in a form readable by a machine (e.g., a computer). For example, a machine-readable medium can include a read only memory (ROM); a random access memory (RAM); a magnetic disk storage media; an optical storage media; and a flash memory device, etc.

Figure 2:
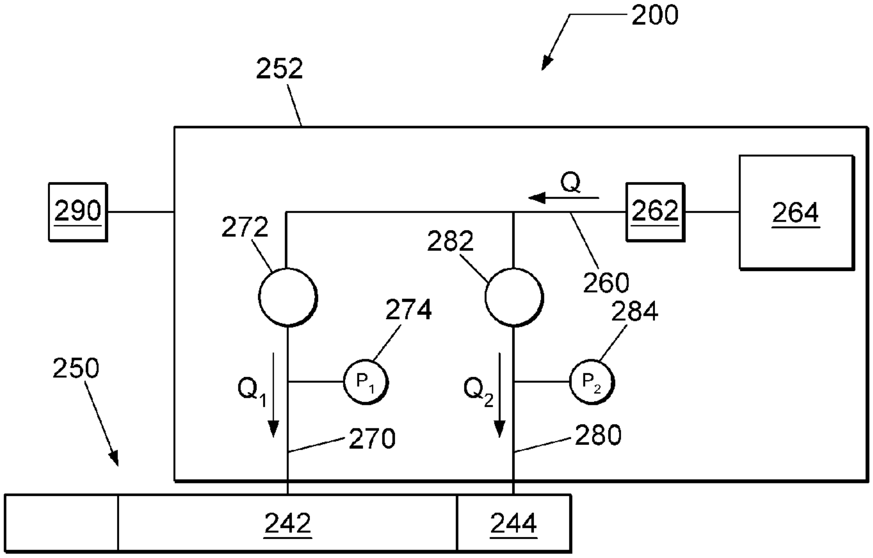
FIG. 2 shows a schematic diagram of a gas distribution system according to another embodiment.

Referring now to FIG. 2, a schematic illustration of a multizone gas distribution system 200 is provided. The multizone gas distribution system 200 may be configured to be coupled to a process chamber. The multizone gas distribution system 200 comprises a multizone gas distribution assembly 250 to which a flow control system 252 is coupled.

The multizone gas distribution assembly 250 comprises a first gas distribution element 242 configured to introduce a first flow rate ($Q_1$) of process gas to the process chamber and a second gas distribution element 244 configured to introduce a second flow rate ($Q_2$) of process gas to the process chamber. The flow control system 252 is coupled to the multizone gas distribution assembly 250, wherein the flow control system 252 comprises a process gas supply system 264 configured to supply the process gas at a known total flow rate (Q) through a process gas supply line 260. The process gas supply line 260 has an inlet end coupled to the process gas supply system 264 and an outlet end that splits into a first gas supply branch 270 that supplies the process gas to the first gas distribution element 242 and a second gas supply branch 280 that supplies the process gas to the second gas distribution element 244.

Additionally, the flow control system 252 comprises a flow rate controller 262 coupled to the process gas supply line 260 and configured to control the known total flow rate (Q), i.e., the sum of the first flow rate ($Q_1$) and the second flow rate ($Q_2$). A first flow control valve 272 coupled to the first gas supply branch 270 is configured to adjust the first flow rate ($Q_1$), and a second control valve 282 coupled to the second gas supply branch 280 is configured to adjust the second flow rate ($Q_2$).

For a given known total flow rate (Q), the first flow rate ($Q_1$) may be increased by adjusting the first flow control valve 272 to a more open state or adjusting the second flow control valve 282 to a more closed state or a combination of both actions. Additionally, for a given known total flow rate (Q), the first flow rate ($Q_1$) may be decreased by adjusting the first flow control valve 272 to a more closed state or adjusting the second flow control valve 282 to a more open state or a combination of both actions. Additionally yet, for a given known total flow rate (Q), the second flow rate ($Q_2$) may be increased by adjusting the first flow control valve 272 to a more closed state or adjusting the second flow control valve 282 to a more open state or a combination of both actions. Furthermore, for a given known total flow rate (Q), the second flow rate ($Q_2$) may be decreased by adjusting the first flow control valve 272 to a more open state or adjusting the second flow control valve 282 to a more closed state or a combination of both actions.

The multizone gas distribution assembly 250 may comprise a showerhead gas distribution system, and the first gas distribution element 242 is arranged in a first region while the second gas distribution element 244 is arranged in a second region. The first region may comprise a substantially central region of the shower gas distribution system and the second region may comprise a substantially peripheral region surrounding the central region.

Referring still to FIG. 2, the flow control system 252 further comprises a first pressure measurement device 274 coupled to the first gas supply branch 270 and configured to measure a first pressure ($P_1$), and a second pressure measurement device 284 coupled to the second gas supply branch 280 and configured to measure a second pressure ($P_2$). A system controller 290 coupled to the flow control system 252 is configured to control the first flow rate ($Q_1$) and the second flow rate ($Q_2$) according to a target flow condition by adjusting the first flow control valve 272 and the second flow control valve 282 and monitoring the first pressure ($P_1$) and the second pressure ($P_2$).

The first pressure measurement device 274 is located on an outlet side of the first flow control valve 272, and the second pressure measurement device 284 is located on an outlet side of the second flow control valve 282. For example, if the first flow control valve 272 is adjusted to a more open state (while the second flow control valve 282 remains substantially unchanged), the first pressure ($P_1$) is expected to increase to accommodate the increase in the first flow rate ($Q_1$). Additionally, for example, if the first flow control valve 272 is adjusted to a more closed state (while the second flow control valve 282 remains substantially unchanged), the first pressure ($P_1$) is expected to decrease to accommodate the decrease in the first flow rate ($Q_1$). Additionally yet, for example, if the second flow control valve 282 is adjusted to a more open state (while the first flow control valve 272 remains substantially unchanged), the second pressure ($P_2$) is expected to increase to accommodate the increase in the second flow rate ($Q_2$). Furthermore, for example, if the second flow control valve 282 is adjusted to a more closed state (while the first flow control valve 272 remains substantially unchanged), the second pressure ($P_2$) is expected to decrease to accommodate the decrease in the second flow rate ($Q_2$).

By measuring the first pressure ($P_1$) and the second pressure ($P_2$), the first flow rate ($Q_1$) and the second flow rate ($Q_2$) may be estimated. For instance, the sum of the first pressure and the second pressure ($P_1+P_2$) may be correlated with the known (total) flow rate (Q), and the ratio of the first pressure and the second pressure ($P_1/P_2$) may be correlated with the ratio between the first flow rate and the second flow rate ($Q_1/Q_2$).

Figure 8A:
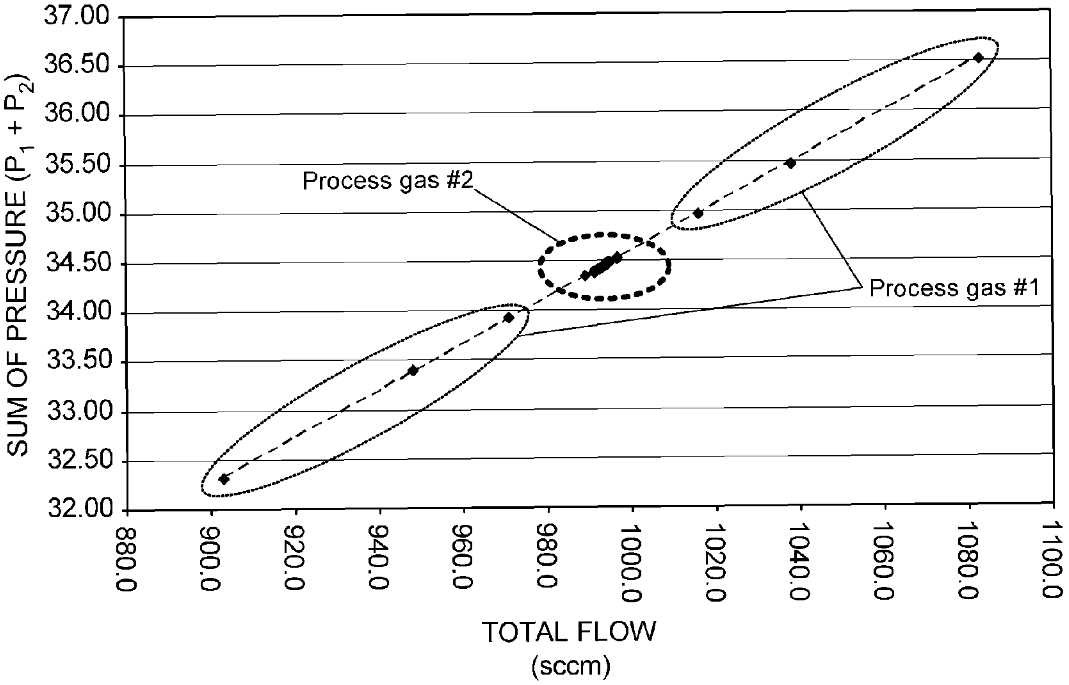
FIGS. 8A through 8D show exemplary data for operating a gas distribution system.
Figure 8B:
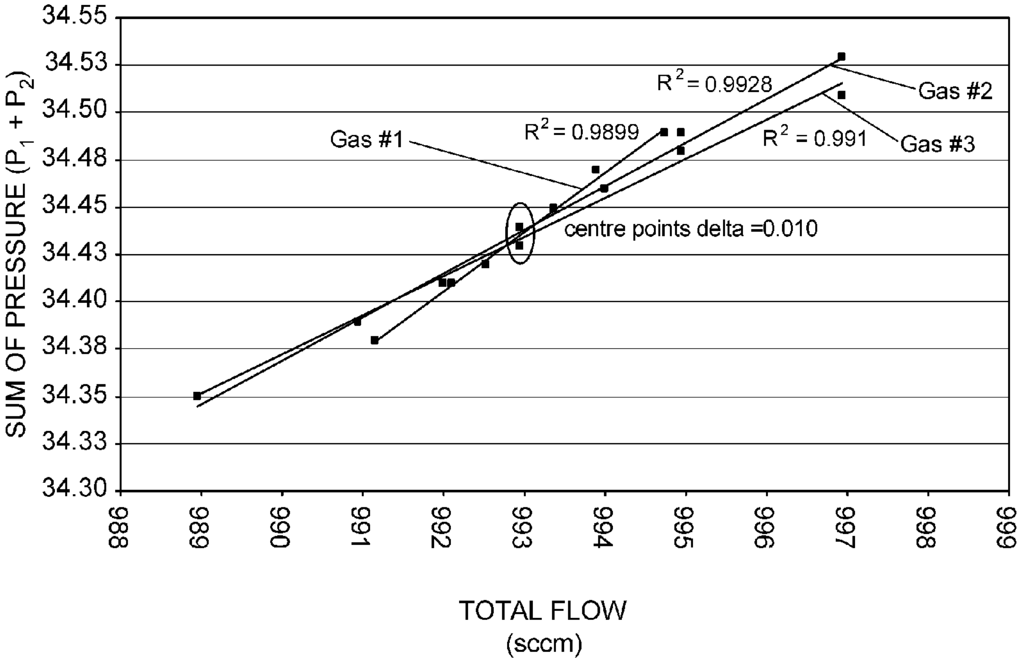

According to an example, as shown in FIGS. 8A and 8B, the sum of the first pressure and the second pressure ($P_1+P_2$) is presented as a function of the known (total) flow rate (Q) (standard cubic centimeters per minute, sccm). In FIGS. 8A and 8B, the process gas comprises a mixture of gas, including a first process gas (process gas #1) that constitutes a majority of the process gas composition and a second process gas (or mixture of gases) that constitutes a minority of the process gas composition. The first process gas comprises argon, and the second process gas comprises several gases including oxygen and one or more fluorocarbon gases.

As illustrated in FIG. 8A, the flow rate of the first process gas (argon) is varied from about 900 sccm to about 1080 sccm, while the flow rate of each constituent of the second process gas remains substantially unchanged. The sum of the pressures correlates well with the known flow rate as indicated by the grouping of data labeled "Process gas #1". Also, as illustrated in FIGS. 8A and 8B, the flow rate of each constituent of the second process gas (i.e., Gas #1, Gas #2, Gas #3) is varied plus or minus 10% from its nominal value, while the flow rate of the first process gas remains substantially unchanged and the flow rate of each of the remaining constituents of the second process gas remain substantially unchanged.

As observed in FIGS. 8A and 8B, when varying one constituent of a process gas mixture, a correlation between the sum of the first pressure and the second pressure ($P_1+P_2$) and the known (total) flow rate (Q) is achieved. However, when other constituents are varied, the relationship between the sum of the pressures ($P_1+P_2$) and the known flow rate (Q) changes. Therefore, the relationship between pressure and flow rate may be obtained for each constituent utilized in the process gas composition.

Figure 8C:
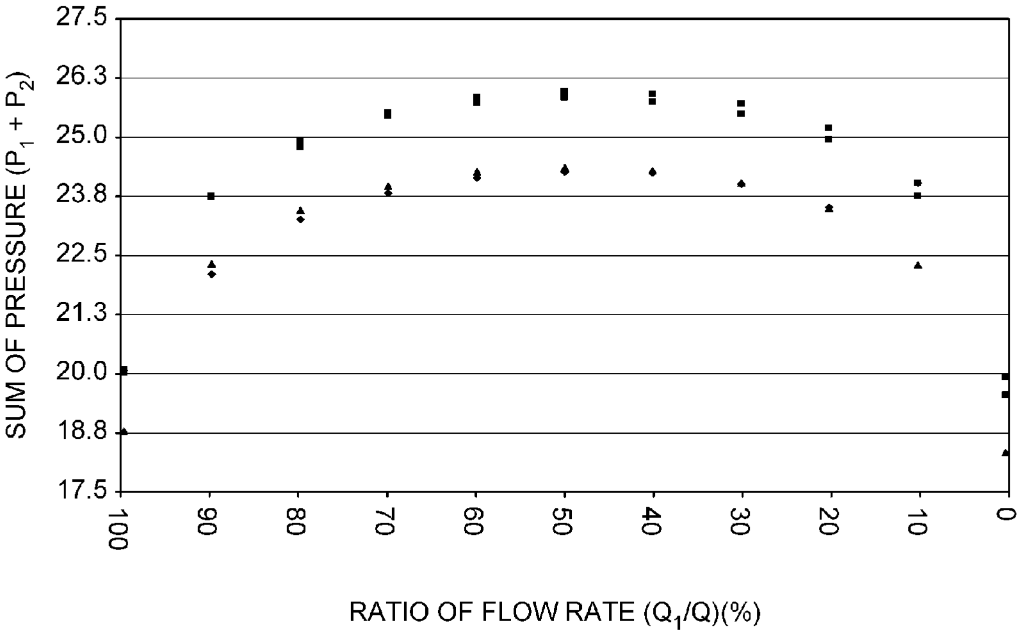

As shown in FIG. 8C, the sum of the first pressure and the second pressure ($P_1+P_2$) is presented as a function of the ratio of the first flow rate and the (total) known flow rate ($Q_1/Q$) (%). Data is presented for different process gas compositions as described in FIGS. 8A and 8B. As observed in FIG. 8C, the sum of the pressures exhibits a similar behavior for each process gas composition.

Figure 8D:
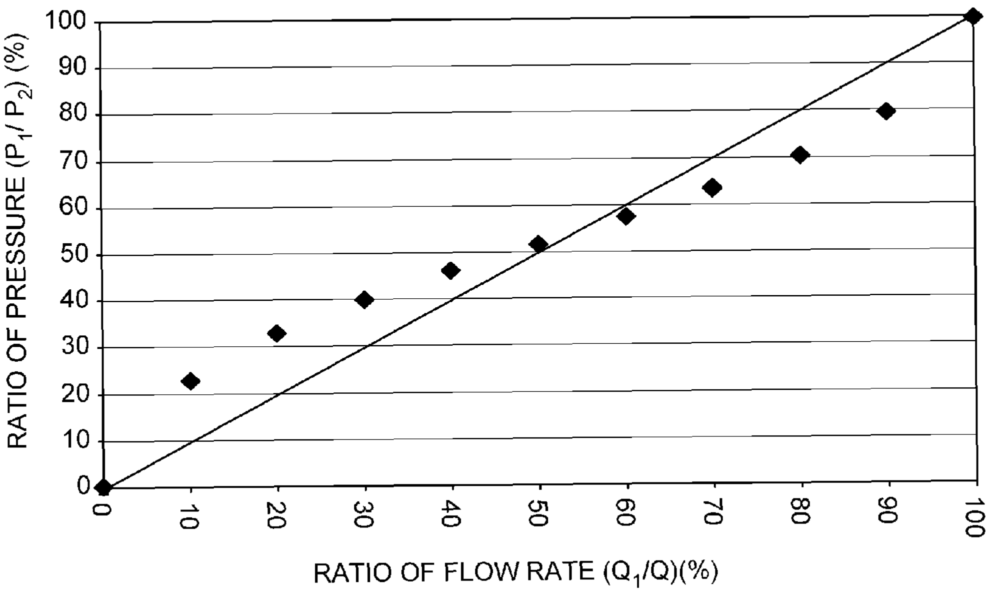

According to yet another example, as shown in FIG. 8D, the ratio of the first pressure and the second pressure ($P_1/P_2$) (%) is presented as a function of the ratio of the first flow rate and the (total) known flow rate ($Q_1/Q$) (%). In a first set of data, the flow ratio ($Q_1/Q$) is varied from 0% to 100% for a first process gas composition. The first process gas composition comprises 600 sccm of oxygen ($Q_2$). In a second set of data, the flow ratio ($Q_1/Q$) is varied from 0% to 100% for a second process gas composition. The second process gas composition comprises 600 sccm of argon (Ar). The first and second sets of data are presented in FIG. 8D. As observed in FIG. 8D, a relationship between the pressure ratio and the flow ratio may be achieved for different process gas compositions. Therefore, using the data of FIGS. 8A and 8B, the total flow rate (Q) may be determined from the sum of the pressures, and the division of the flow rate (Q) into a first flow rate ($Q_1$) and a second flow rate ($Q_2$) may be determined from FIG. 8D.

Figure 3:
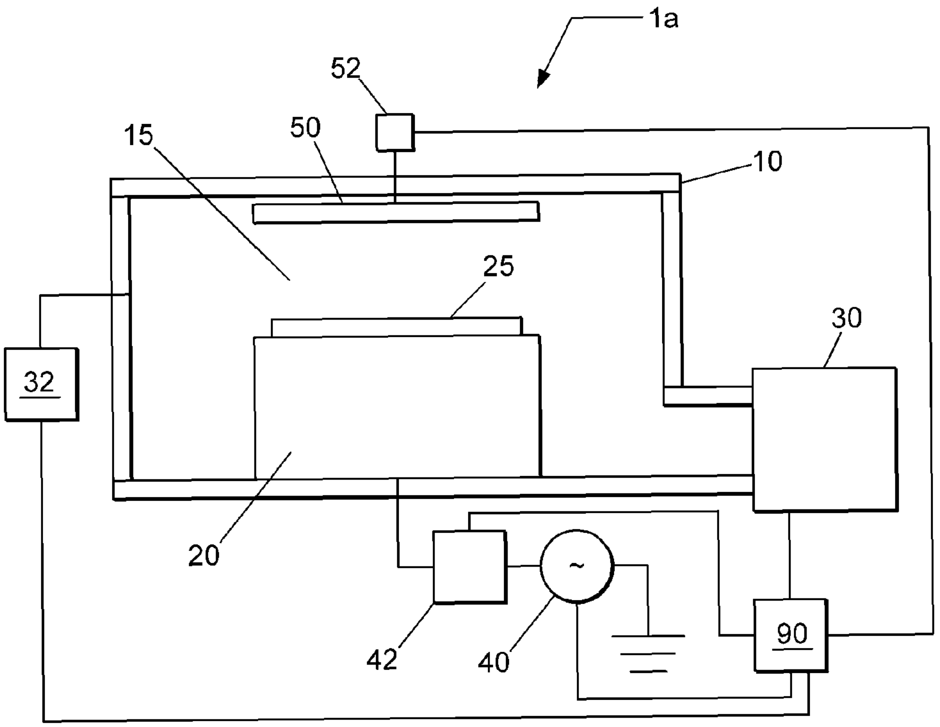
FIG. 3 illustrates a plasma processing system according to another embodiment.

FIG. 3 illustrates a plasma processing system according to another embodiment. Plasma processing system 1*a* comprises a process chamber 10, substrate holder 20, upon which a substrate 25 to be processed is affixed, and vacuum pumping system 30. Substrate 25 can be a semiconductor substrate, a wafer or a liquid crystal display. Process chamber 10 can be configured to facilitate the generation of plasma in process space 15 adjacent a surface of substrate 25. An ionizable gas or mixture of gases is introduced via a multizone gas distribution system including a multizone gas distribution assembly 50 and a flow control system 52, and the process pressure is adjusted. For example, a control mechanism (not shown) can be used to throttle the vacuum pumping system 30. Plasma can be utilized to create materials specific to a predetermined materials process, and/or to aid the removal of material from the exposed surfaces of substrate 25. The plasma processing system 1*a* can be configured to process a substrate of any size, such as 200 mm substrates, 300 mm substrates, or larger.

Substrate 25 can be affixed to the substrate holder 20 via a mechanical clamping system or an electrical clamping system, such as an electrostatic clamping system. Furthermore, substrate holder 20 can further include a cooling system or heating system that includes a re-circulating fluid flow that receives heat from substrate holder 20 and transfers heat to a heat exchanger system (not shown) when cooling, or receives heat from a heat exchanger and transfers heat to substrate holder 20 when heating.

Moreover, gas can be delivered to the back-side of substrate 25 via a backside gas system to improve the gas-gap thermal conductance between substrate 25 and substrate holder 20. Such a system can be utilized when temperature control of the substrate 25 is required at elevated or reduced temperatures. For example, the backside gas system can comprise a two-zone gas distribution system, wherein the backside gas (e.g., helium) pressure can be independently varied between the center and the edge of substrate 25. In other embodiments, heating/cooling elements, such as resistive heating elements, or thermo-electric heaters/coolers can be included in the substrate holder 20, as well as the chamber wall of the process chamber 10 and any other component within the plasma processing system 1*a*.

In the embodiment shown in FIG. 3, substrate holder 20 can comprise an electrode through which RF power is coupled to plasma in process space 15. For example, substrate holder 20 can be electrically biased at a RF voltage via the transmission of RF power from a RF generator 40 through an optional impedance match network 42 to substrate holder 20. The RF bias can serve to heat electrons to form and maintain plasma, or affect the ion energy distribution function within the sheath, or both. In this configuration, the system can operate as a reactive ion etch (RIE) reactor, wherein the process chamber 10 and an upper gas injection electrode serve as ground surfaces. A typical frequency for the RF bias can range from 0.1 MHz to 100 MHz. RF systems for plasma processing are well known to those skilled in the art.

Furthermore, impedance match network 42 serves to improve the transfer of RF power to plasma in process chamber 10 by reducing the reflected power. Match network topologies (e.g. L-type, π-type, T-type, etc.) and automatic control methods are well known to those skilled in the art.

Referring still to FIG. 3, plasma processing system 1*a* further comprises an optional direct current (DC) power supply (not shown) coupled to an upper electrode, that may include the multizone gas distribution assembly 50, opposing substrate 25. The upper electrode may comprise an electrode plate. The electrode plate may comprise a silicon-containing electrode plate. Moreover, the electrode plate may comprise a doped silicon electrode plate. The DC power supply can include a variable DC power supply. Additionally, the DC power supply can include a bipolar DC power supply. The DC power supply can further include a system configured to perform at least one of monitoring, adjusting, or controlling the polarity, current, voltage, or on/off state of the DC power supply. Once plasma is formed, the DC power supply facilitates the formation of a ballistic electron beam. An electrical filter may be utilized to de-couple RF power from the DC power supply.

For example, the DC voltage applied to the upper electrode by DC power supply may range from approximately −2000 volts (V) to approximately 1000 V. Desirably, the absolute value of the DC voltage has a value equal to or greater than approximately 100 V, and more desirably, the absolute value of the DC voltage has a value equal to or greater than approximately 500 V. Additionally, it is desirable that the DC voltage has a negative polarity. Furthermore, it is desirable that the DC voltage is a negative voltage having an absolute value greater than the self-bias voltage generated on a surface of the upper electrode. The surface of the upper electrode facing the substrate holder 20 may be comprised of a silicon-containing material.

Referring still to FIG. 3, plasma processing system 1*a* further comprises a system controller 90 as described above. System controller 90 comprises a microprocessor, memory, and a digital I/O port capable of generating control voltages sufficient to communicate and activate inputs to plasma processing system 1*a* as well as monitor outputs from plasma processing system 1*a*. Moreover, system controller 90 can be coupled to and can exchange information with RF generator 40, impedance match network 42, optional DC power supply, multizone gas distribution assembly 50, flow control system 52, a diagnostic system 32, vacuum pumping system 30, as well as the backside gas delivery system (not shown), the substrate/substrate holder temperature measurement system (not shown), and/or the electrostatic clamping system (not shown).

The diagnostic system 32 can include an optical diagnostic subsystem (not shown). The diagnostic system 32 can be configured to provide an endpoint signal that may indicate the completion of a specific etch process. Additionally, for example, the diagnostic system 32 can be configured to provide a metrology signal that may provide data indicating the state of etch processes performed on the substrate (e.g., profile data for a feature, structure, deep trench, etc.). For instance, diagnostic system 32 may include an optical emission spectrometry system for etch process endpoint detection, or a scatterometer, incorporating beam profile ellipsometry (ellipsometer) and beam profile reflectometry (reflectometer) for pattern profile determination, or both.

The optical diagnostic subsystem can comprise a detector such as a (silicon) photodiode or a photomultiplier tube (PMT) for measuring the light intensity emitted from the plasma. The diagnostic system 32 can further include an optical filter such as a narrow-band interference filter. In an alternate embodiment, the diagnostic system 32 can include a line CCD (charge coupled device), a CID (charge injection device) array, or a light dispersing device such as a grating or a prism. Additionally, diagnostic system 32 can include a monochromator (e.g., grating/detector system) for measuring light at a given wavelength, or a spectrometer (e.g., with a rotating grating) for measuring the light spectrum.

The diagnostic system 32 can include a high resolution Optical Emission Spectroscopy (OES) sensor such as from Peak Sensor Systems, or Verity Instruments, Inc. Such an OES sensor can have a broad spectrum that spans the ultraviolet (UV), visible (VIS), and near infrared (NIR) light spectrums. The resolution can be approximately 1.4 Angstroms, that is, the sensor can be capable of collecting about 5550 wavelengths from about 240 to about 1000 nm. For example, the OES sensor can be equipped with high sensitivity miniature fiber optic UV-VIS-NIR spectrometers, which are, in turn, integrated with 2048 pixel linear CCD arrays.

The spectrometers receive light transmitted through single and bundled optical fibers, where the light output from the optical fibers is dispersed across the line CCD array using a fixed grating. Similar to the configuration described above, light passing through an optical vacuum window can be focused onto the input end of the optical fibers via a convex spherical lens. Three spectrometers, each specifically tuned for a given spectral range (UV, VIS and NIR), form a sensor for a process chamber. Each spectrometer includes an independent A/D converter. And lastly, depending upon the sensor utilization, a full emission spectrum can be recorded every 0.1 to 1.0 seconds.

The diagnostic system 32 can include a metrology system that may be either an in-situ or ex-situ device. For example, the metrology system may include a scatterometer, incorporating beam profile ellipsometry (ellipsometer) and beam profile reflectometry (reflectometer), commercially available from Therma-Wave, Inc. (1250 Reliance Way, Fremont, Calif. 94539) or Nanometrics, Inc. (1550 Buckeye Drive, Milpitas, Calif. 95035), which is positioned within a transfer chamber (not shown) to analyze substrates. For instance, the metrology system may include an integrated optical digital profile (iODP) scatterometry system.

In the embodiment shown in FIG. 4, the plasma processing system 1*b* can be similar to the embodiment of FIG. 3 and further comprise either a stationary, or mechanically or electrically rotating magnetic field system 60, in order to potentially increase plasma density and/or improve plasma processing uniformity, in addition to those components described with reference to FIG. 3. Moreover, controller 90 can be coupled to magnetic field system 60 in order to regulate the speed of rotation and field strength. The design and implementation of a rotating magnetic field is well known to those skilled in the art.

Figure 4:
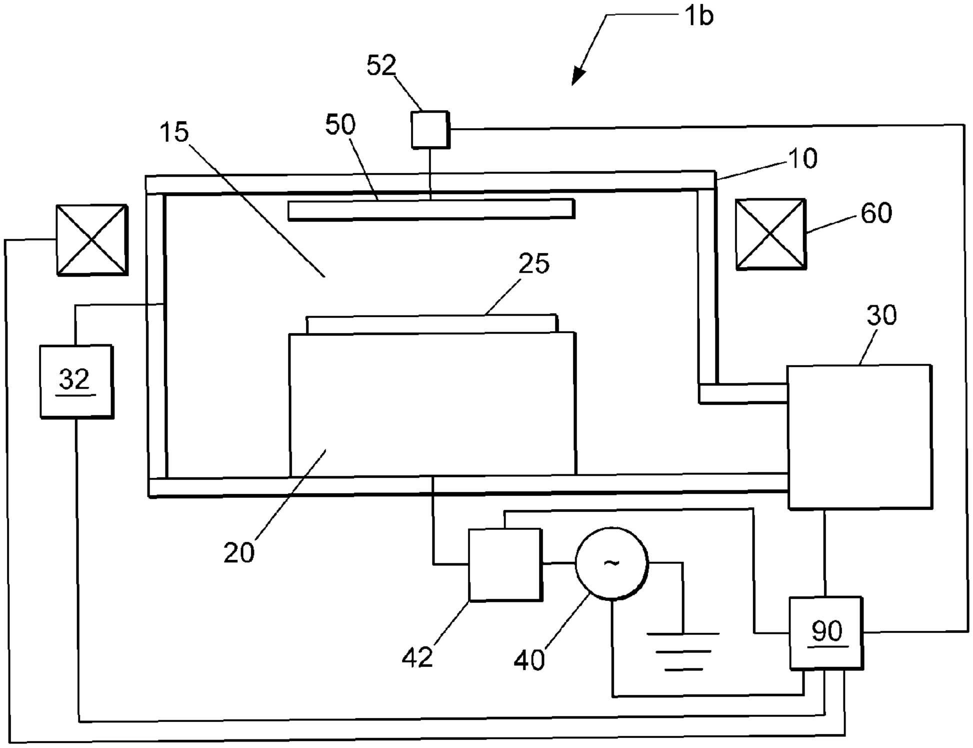
FIG. 4 illustrates a plasma processing system according to another embodiment.
Figure 5:
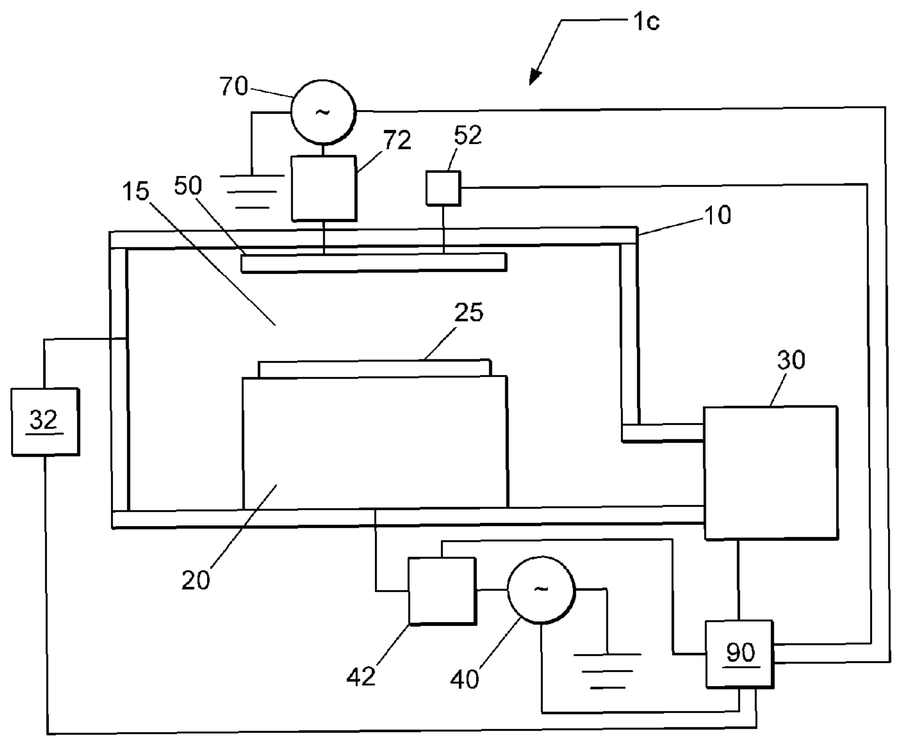
FIG. 5 illustrates a plasma processing system according to another embodiment.

In the embodiment shown in FIG. 5, the plasma processing system 1*c* can be similar to the embodiment of FIG. 3 or FIG. 4, and can further comprise an RF generator 70 configured to couple RF power to an upper electrode, that may include multizone gas distribution assembly 50, through an optional impedance match network 72. A typical frequency for the application of RF power to upper electrode can range from about 0.1 MHz to about 200 MHz. Additionally, a typical frequency for the application of power to the substrate holder 20 (or lower electrode) can range from about 0.1 MHz to about 100 MHz. For example, the RF frequency coupled to the upper electrode can be relatively higher than the RF frequency coupled to the substrate holder 20. Optionally, the RF power to the upper electrode from RF generator 70 can be amplitude modulated, or the RF power to the substrate holder 20 from RF generator 40 can be amplitude modulated, or both RF powers can be amplitude modulated. The RF power at the higher RF frequency can be amplitude modulated. Moreover, system controller 90 is coupled to RF generator 70 and impedance match network 72 in order to control the application of RF power to upper electrode. The design and implementation of an upper electrode is well known to those skilled in the art.

Referring still to FIG. 5, the optional DC power supply may be directly coupled to the upper electrode, or it may be coupled to the RF transmission line extending from an output end of impedance match network 72 to the upper electrode. An electrical filter may be utilized to de-couple RF power from the DC power supply.

Figure 6:
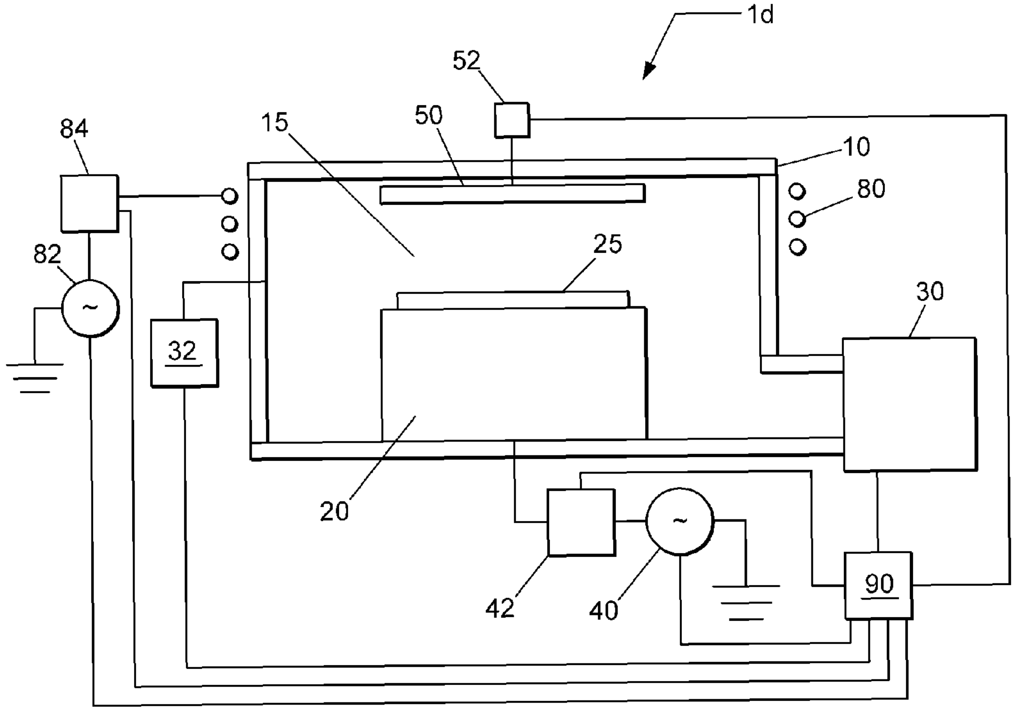
FIG. 6 illustrates a plasma processing system according to another embodiment.

In the embodiment shown in FIG. 6, the plasma processing system 1*d* can, for example, be similar to the embodiments of FIGS. 3, 4 and 5, and can further comprise an inductive coil 80 to which RF power is coupled via RF generator 82 through an optional impedance match network 84. RF power is inductively coupled from inductive coil 80 through a dielectric window (not shown) to process space 15. A typical frequency for the application of RF power to the inductive coil 80 can range from about 10 MHz to about 100 MHz. Similarly, a typical frequency for the application of power to the lower electrode can range from about 0.1 MHz to about 100 MHz. In addition, a slotted Faraday shield (not shown) can be employed to reduce capacitive coupling between the inductive coil 80 and plasma. Moreover, controller 90 is coupled to RF generator 82 and impedance match network 84 in order to control the application of power to inductive coil 80. In an alternate embodiment, inductive coil 80 can be a "spiral" coil or "pancake" coil in communication with the process space 15 from above as in a transformer coupled plasma (TCP) reactor. The design and implementation of an inductively coupled plasma (ICP) source, or TCP source, is well known to those skilled in the art.

Alternately, the plasma can be formed using electron cyclotron resonance (ECR). In yet another embodiment, the plasma is formed from the launching of a Helicon wave. In yet another embodiment, the plasma is formed from a propagating surface wave. Each plasma source described above is well known to those skilled in the art.

Figure 7:
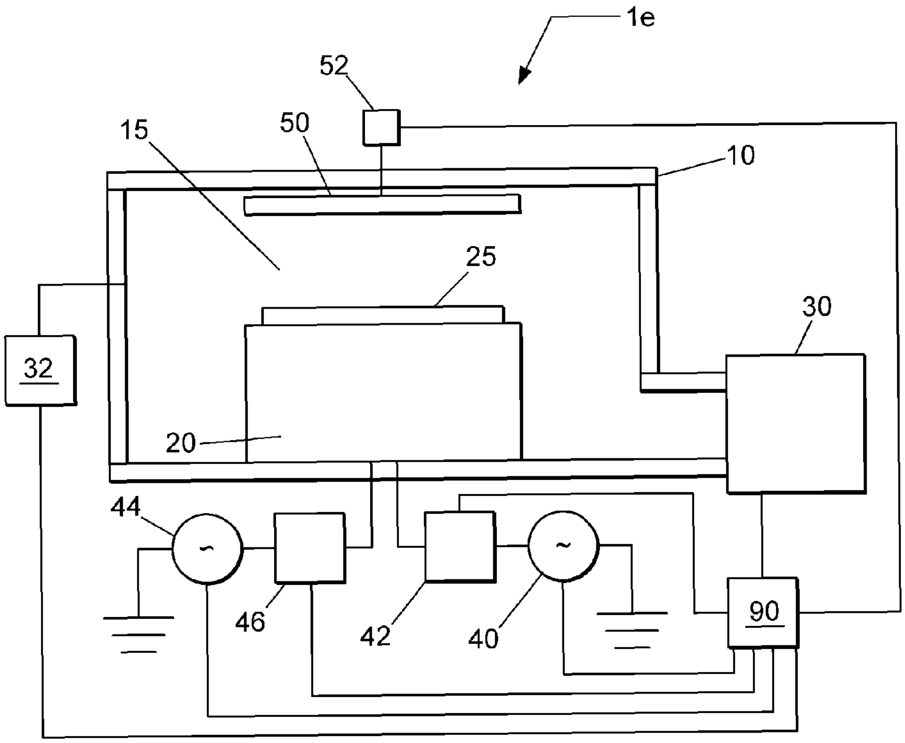
FIG. 7 illustrates a plasma processing system according to another embodiment.

In the embodiment shown in FIG. 7, the plasma processing system 1*e* can, for example, be similar to the embodiments of FIGS. 3, 4 and 5, and can further comprise a second RF generator 44 configured to couple RF power to substrate holder 20 through another optional impedance match network 46. A typical frequency for the application of RF power to substrate holder 20 can range from about 0.1 MHz to about 200 MHz for either the first RF generator 40 or the second RF generator 44 or both. The RF frequency for the second RF generator 44 can be relatively greater than the RF frequency for the first RF generator 40. Furthermore, the RF power to the substrate holder 20 from RF generator 40 can be amplitude modulated, or the RF power to the substrate holder 20 from RF generator 44 can be amplitude modulated, or both RF powers can be amplitude modulated. The RF power at the higher RF frequency can be amplitude modulated. Moreover, system controller 90 is coupled to the second RF generator 44 and impedance match network 46 in order to control the application of RF power to substrate holder 20. The design and implementation of an RF system for a substrate holder is well known to those skilled in the art.

Figure 9:
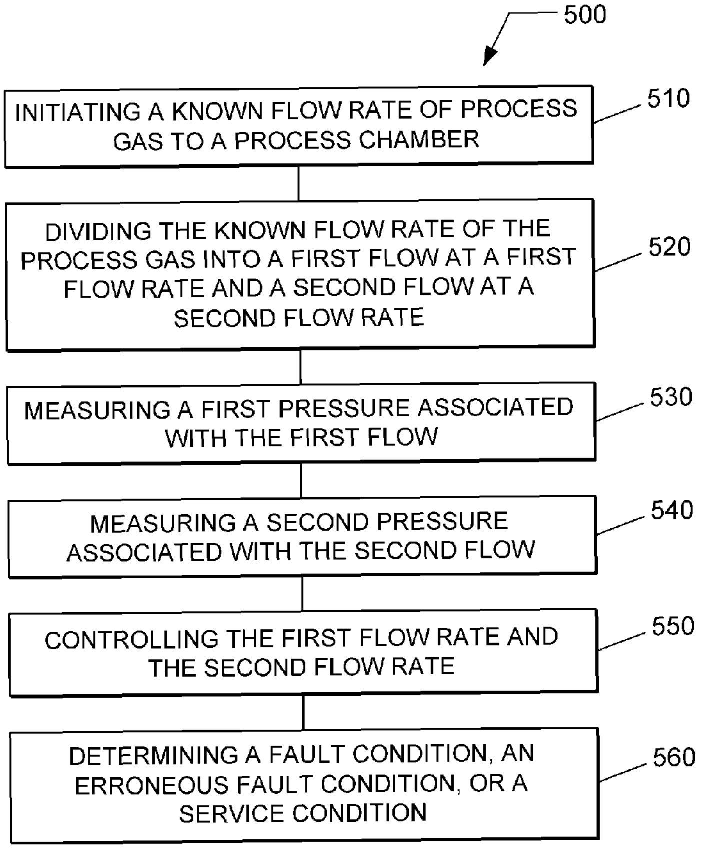
FIG. 9 illustrates a method of operating a gas distribution system according to yet another embodiment.

Referring now to FIG. 9, a flow chart 500 of a method for operating a multizone gas distribution system is presented. Flow chart 500 begins in 510 with initiating a known flow rate (Q) of a process gas to a process chamber. For example, the multizone gas distribution system may include any one of the systems described in FIGS. 1 through 7, or may include any combination of components described in these FIGs.

In 520, the known flow rate (Q) of the process gas is divided into a first flow of the process gas at a first flow rate ($Q_1$) and a second flow of the process gas at a second flow rate ($Q_2$). For example, as illustrated in FIG. 2, a first flow control valve and a second control valve may be utilized to divide the known flow rate (Q) into the first flow rate ($Q_1$) and the second flow rate ($Q_2$).

In 530, a first pressure ($P_1$) associated with the first flow of the process gas is measured. For example, the first pressure ($P_1$) may be measured downstream from the outlet of the first flow control valve.

In 540, a second pressure ($P_2$) associated with the second flow of the process gas is measured. For example, the second pressure ($P_2$) may be measured downstream from the outlet of the second flow control valve.

In 550, the first flow rate ($Q_1$) and the second flow rate ($Q_2$) are controlled according to a target flow condition by adjusting a first conductance of the first flow of the process gas and a second conductance of the second flow of the process gas and monitoring the first pressure ($P_1$) and the second pressure ($P_2$).

The target flow condition may include any flow parameter associated with the flow control system. For example, the target flow condition may include a first flow rate ($Q_1$), a second flow rate ($Q_2$), a total flow rate (Q, $Q_1+Q_2$) (i.e., sum of the first flow rate and the second flow rate), or a flow ratio such as a ratio of the first flow rate to the second flow rate ($Q_1/Q_2$), a ratio of the first flow rate to the total flow rate ($Q_1/Q$) or a ratio of the second flow rate to the total flow rate ($Q_2/Q$), or any mathematical combination thereof. Additionally, for example, the target flow condition may include a first pressure ($P_1$), a second pressure ($P_2$), a total pressure ($P_1+P_2$) (i.e., sum of the first pressure and the second pressure), or a pressure ratio such as a ratio of the first pressure to the second pressure ($P_1/P_2$), a ratio of the first pressure to the total pressure ($P_1/P_1+P_2$) or a ratio of the second pressure to the total pressure ($P_2/P_1+P_2$), or any mathematical combination thereof.

As described above, a first correlation between the sum of the first pressure and the second pressure ($P_1+P_2$) and the sum of the first flow rate and the second flow rate (Q, $Q_1+Q_2$) may be established. Also, as described above, a second correlation between the ratio of the first pressure to the second pressure ($P_1/P_2$) and the ratio of the first flow rate to the second flow rate ($Q_1/Q_2$) may be established. The first flow rate ($Q_1$) or the second flow rate ($Q_2$) or both may be computed by using the first correlation, the second correlation, the measurement of the first pressure ($P_1$) and the measurement of the second pressure ($P_2$). Alternatively, the sum of the first flow rate and the second flow rate ($Q_1+Q_2$) may not be determined from the first correlation and the known flow rate (Q) may be used. The known flow rate (Q) and the flow ratio determined using the measured pressure ratio and the second correlation may be utilized to compute the first flow rate ($Q_1$) and the second flow rate ($Q_2$).

As an example, the first flow rate ($Q_1$) may be determined by the following procedure: computing the ratio of the first pressure to the second pressure ($P_1/P_2$), determining a flow ratio ($Q_1/Q_2$) from the second correlation using the ratio of the first pressure to the second pressure ($P_1/P_2$), computing the sum of the first pressure and the second pressure ($P_1+P_2$), optionally determining the total flow rate (Q, $Q_1+Q_2$) using the sum of the first pressure and the second pressure ($P_1+P_2$), and computing the first flow rate ($Q_1$) using the determined flow ratio ($Q_1/Q_2$) and either the determined total flow rate ($Q_1+Q_2$) or the known flow rate (Q).

In 560, the first pressure ($P_1$), the second pressure ($P_2$), or any mathematical combination thereof is utilized to determine a fault condition, an erroneous fault condition, or a service condition, or any combination of two or more thereof.

In one example, the first pressure ($P_1$), the second pressure ($P_2$), the sum of the first pressure and the second pressure ($P_1+P_2$), or the ratio of the first pressure and the second pressure ($P_1/P_2$), or a mathematical combination thereof is monitored during the execution of a process in the plasma processing system. When the change in the chosen parameter (or parameters) during the execution of a process on a substrate exceeds a pre-determined threshold value, an operator of the plasma processing system may be alerted to the occurrence of a fault condition associated with the variation in the flow conditions. For instance, the threshold value may include an absolute value (known to be always greater than or less than the typical range of values for the chosen parameter), an upper control limit and lower limit set at a fraction (i.e., 20%) of the mean value of the parameter during processing, or an upper control limit and a lower control limit set at an integer number (i.e., 3) of root mean square (rms) values of the fluctuation of the flow parameter during processing.

In another example, the first pressure ($P_1$), the second pressure ($P_2$), the sum of the first pressure and the second pressure ($P_1+P_2$), or the ratio of the first pressure and the second pressure ($P_1/P_2$), or a mathematical combination thereof is monitored during the execution of a process on the substrate in the plasma processing system. During the process, the chosen parameter indicates no abrupt change; however, the mass flow controller that sets the known flow rate (Q) reports a sudden change in mass flow rate. Based upon this data, an operator may identify the change reported from the mass flow controller as an erroneous fault condition, and continue to process substrates in the plasma processing system. Alternatively, the operator may identify the change reported from the mass flow controller as an erroneous fault condition, and discontinue to process substrates in the plasma processing system in order to investigate the mass flow controller.

In yet another example, the first pressure ($P_1$), the second pressure ($P_2$), the sum of the first pressure and the second pressure ($P_1+P_2$), or the ratio of the first pressure and the second pressure ($P_1/P_2$), or a mathematical combination thereof is monitored during the sequential execution of a plurality of substrates through a process in the plasma processing system. During the processing of each substrate, the chosen parameter is monitored as a function of substrate number, lot number, or radio frequency (RF) hours in the plasma processing system. When the value of the chosen parameter, or rate of change in the chosen parameter becomes greater than (or less than) a pre-determined value, an operator may be notified of a service condition. The service condition may include, for instance, re-calibrating the multizone gas distribution system or cleaning the plasma processing system in order to remove residue accumulated on the internal surfaces of the plasma processing system.

Although only certain embodiments of this invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. A method of supplying a process gas to a process chamber and controlling flow conditions, comprising:

initiating a known flow rate of a process gas to a process chamber;

dividing said known flow rate of said process gas into a first flow of said process gas at a first flow rate and a second flow of said process gas at a second flow rate;

measuring a first pressure associated with said first flow of said process gas;

measuring a second pressure associated with said second flow of said process gas;

calculating a first correlation of said flow conditions between the sum of said first pressure and said second pressure and the sum of said first flow rate and said second flow rate;

calculating a second correlation of said flow conditions between a ratio of said first flow rate to said second flow rate and a ratio of said first pressure to said second pressure;

controlling said first flow rate and said second flow rate according to a target flow condition by adjusting a first conductance of said first flow of said process gas and a second conductance of said second flow of said process gas; and determining a fault condition, an erroneous fault condition or a service condition associated with a variation in said flow conditions during the supply of said process gas to said process chamber by monitoring said first pressure, or said second pressure, or a combination of said first pressure and said second pressure.

2. The method of claim 1, further comprising:

determining said first flow rate or said second flow rate or both by using said first correlation, said second correlation, said measurement of said first pressure and said measurement of said second pressure.

3. The method of claim 2, wherein said determining said first flow rate comprises:

computing the ratio of said first pressure to said second pressure, determining a flow ratio from said second correlation using the ratio of said first pressure to said second pressure, computing the sum of said first pressure and said second pressure, determining a total flow rate using the sum of said first pressure and said second pressure, and computing said first flow rate using said determined flow ratio and said determined total flow rate or said known flow rate.

4. The method of claim 1, wherein said target flow condition comprises a target ratio of said first flow rate to said known flow rate or a target ratio of said second flow rate to said known flow rate or a target ratio of said first flow rate to said second flow rate, and wherein said controlling said first flow rate and said second flow rate comprises comparing said ratio of said first pressure to said second pressure with said target ratio.

5. The method of claim 1, wherein said determining said fault condition comprises correlating a temporal variation in said first pressure or said second pressure or said combination of said first pressure and said second pressure with a variation in said known flow rate.

6. The method of claim 1, wherein said determining said erroneous fault condition comprises correlating a substantially small temporal variation in said first pressure or said second pressure or said combination of said first pressure and said second pressure with a variation in said known flow rate.

7. The method of claim 1, wherein said determining said service condition comprises detecting a gradual temporal variation in said first pressure or said second pressure or said combination of said first pressure and said second pressure while not varying said known flow rate.

* * * * *